United States Patent
Barthel (10) Patent No.: US 10,310,254 B2
(45) Date of Patent: Jun. 4, 2019

(54) CAMERA MODULE FOR A MOTOR VEHICLE

(71) Applicant: Huf Huelsbeck & Fuerst GmbH & Co. KG, Velbert (DE)

(72) Inventor: Joachim Barthel, Essen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/757,205

(22) PCT Filed: Jul. 21, 2016

(86) PCT No.: PCT/EP2016/067350
§ 371 (c)(1),
(2) Date: Mar. 2, 2018

(87) PCT Pub. No.: WO2017/036664
PCT Pub. Date: Mar. 9, 2017

(65) Prior Publication Data
US 2018/0267297 A1    Sep. 20, 2018

(30) Foreign Application Priority Data

Sep. 4, 2015 (DE) .................. 10 2015 114 829

(51) Int. Cl.
*G02B 27/00* (2006.01)
*B60S 1/56* (2006.01)
(Continued)

(52) U.S. Cl.
CPC ............ *G02B 27/0006* (2013.01); *B60S 1/52* (2013.01); *B60S 1/56* (2013.01); *H04N 5/2254* (2013.01); *B60R 2300/10* (2013.01)

(58) Field of Classification Search
CPC .............. G02B 27/0006; H04N 5/2254; B60R 2300/10
See application file for complete search history.

(56) References Cited

U.S. PATENT DOCUMENTS 9,746,666 B2 *  8/2017  Eineren .................. G03B 17/02
9,783,167 B2 * 10/2017  Niemczyk .............. B60S 1/528
(Continued)

FOREIGN PATENT DOCUMENTS

DE   102008008656 A1   8/2009
DE   102010007850 A1   9/2010

OTHER PUBLICATIONS

European Patent Office as the International Searching Authority, International Search Report for PCT Application No. PCT/EP2016/067350 dated Oct. 24, 2016.
(Continued)

*Primary Examiner* — Tsion B Owens
(74) *Attorney, Agent, or Firm* — Honigman LLP; Matthew H. Szalach; Jonathan P. O'Brien (57) ABSTRACT

A camera module for a motor vehicle having a camera unit with a camera and a lens, wherein the camera unit is arranged in a housing, and wherein the camera unit is designed to be movable between a passive position, in which the camera unit is arranged at least partially in the housing, and an active position, in which the camera unit serves to visually detect an outer area of a motor vehicle, and with a drive unit which is coupled to the camera unit and is designed to move the camera unit between the passive position and the active position, and with a cleaning device for cleaning the lens of the camera unit with a jet of fluid, wherein the camera module has a deflection element for deflecting the jet of fluid onto the lens.

17 Claims, 6 Drawing Sheets

(51) Int. Cl.
    *B60S 1/52*    (2006.01)
    *H04N 5/225*   (2006.01)

(56) References Cited

U.S. PATENT DOCUMENTS

| | | | |
|---|---|---|---|
| 10,144,395 B2* | 12/2018 | Lopez Galera | ........... B60S 1/56 |
| 2003/0146831 A1 | 8/2003 | Berberich et al. | |
| 2003/0155001 A1* | 8/2003 | Hoetzer | ............... B60S 1/0822 |
| | | | 134/37 |

OTHER PUBLICATIONS

European Patent Office as the International Searching Authority, Written Opinion for PCT Application No. PCT/EP2016/067350 dated Oct. 24, 2016.

* cited by examiner

CAMERA MODULE FOR A MOTOR VEHICLE

CROSS-REFERENCE TO RELATED APPLICATIONS

This application claims priority under 35 U.S.C. § 371 to Patent Cooperation Treaty Application No. PCT/EP2016/067350, filed Jul. 21, 2016, which claims the benefit of earlier-filed German Application No. DE 10 2015 114 829.3, filed Sep. 4, 2015, the entire contents of which are incorporated herein by reference.

TECHNICAL FIELD

The present invention relates to a camera module for a motor vehicle according to the preamble of claim 1, wherein the camera module includes a camera unit with a camera and a lens, wherein the camera unit is arranged in a housing, and wherein the camera unit is designed to be movable between a passive position in which the camera unit is at least partially located in the housing and an active position in which the camera unit is used for image acquisition of an outside area of a motor vehicle. In addition, the camera module includes a drive unit that is coupled to the camera unit and is designed to move the camera unit between the passive position and the active position, and a cleaning device for cleaning the lens of the camera unit with a fluid jet.

BACKGROUND

Known from prior art camera modules for motor vehicles are cleaning devices that apply a fluid jet directly to the lens for cleaning the lens or an outer lens surface. The application usually takes place via nozzles of the cleaning device that are located in the immediate vicinity of the lens or the outer lens surface.

It is a disadvantage in the prior art that cleaning of the lenses usually is inadequate or incomplete. This can be attributed, in particular, to the fact that the nozzles of the cleaning device only reach or clean those areas of the outer lens surface that are not located in a stagnant area or a spray shadow starting from the nozzle of the cleaning device. This occurs most particularly in the case of convex outer lens surfaces.

The invention is based on the object of specifying a camera module that overcomes the problems known from the prior art and that allows improved cleaning of the outer lens surface.

This object is attained by the subject matter with the features from the independent claim. Advantageous embodiments of the invention are the subject matter of the figures, the description, and the dependent claims.

According to the invention, the object is attained by a camera module for a motor vehicle having a camera unit with a camera and a lens, wherein the camera unit is arranged in a housing, and wherein the camera unit is designed to be movable between a passive position in which the camera unit is at least partially located in the housing and an active position in which the camera unit is used for image acquisition of an outside area of a motor vehicle, and having a drive unit that is coupled to the camera unit and is designed to move the camera unit between the passive position and the active position, and having a cleaning device for cleaning the lens of the camera unit with a fluid jet, wherein the camera module has a deflection element for deflecting the fluid jet onto the lens. This achieves, for example, the technical advantage that complete and thorough cleaning of the outer lens surface takes place. The deflection element prevents a stagnant area from remaining on the outer lens surface by applying the fluid jet from an appropriate direction.

In consequence, the quality of the cleaning process is considerably improved.

Through suitable design of the deflection element, it is possible to orient the fluid jet by impingement on the deflection element in such a way that the entire outer lens surface is reached by the fluid jet. To this end, the deflection element is designed to deflect the fluid jet for cleaning of the entire outer lens surface.

According to a special embodiment, the camera module has a door to cover the camera unit in the passive position. This achieves, for example, the technical advantage that the entire camera unit is protected and shielded from external influences in the passive position. Camera lenses frequently represent sensitive components and hence are easily damaged. In this regard, a door represents an effective protective device for prolonging the service life of a camera lens.

In order to implement the arrangement of the deflection element in an especially simple manner, the deflection element is located on the door. In this case, implementing the deflection element as a single piece with the door is especially economical to manufacture and entails comparatively low assembly effort. Alternatively, however, it is equally possible according to another embodiment to design the deflection element such that it can be clipped onto the door. In particular, this would have the advantage that different deflection elements suitable for different lenses or different camera units can be arranged on the door. In this regard, this embodiment allows flexible adaptation to different lenses or different camera units.

In order to achieve cleaning performance especially effectively, or in order to ensure deflection of the fluid jet onto the outer lens surface in an especially precise manner, the deflection element is located on the door in the center and adjacent to the lens of the camera.

In order to permit deflection of the fluid jet from the cleaning device via the deflection element onto the outer lens surface in an especially targeted manner and as precisely as possible, the deflection element is designed in the form of a ramp. Alternatively, however, it is likewise possible to design the deflection element to be concave according to another embodiment.

In order to further improve cleaning performance or in order to implement complete wetting of the entire outer lens surface, the deflection element is designed to be pivotable. In combination with a drive, it would be possible here to allow especially thorough cleaning of the outer lens surface by means of a pivoting motion during the cleaning process.

In order to achieve an especially compact cleaning device and in order to accommodate the cleaning device in the housing of the camera module, the cleaning device is designed to be rod-shaped. The cleaning fluid is thus discharged laterally from the rod-shaped cleaning device. In interaction with the deflection device, however, cleaning of the entire outer lens surface is possible with no stagnant area and without spray shadows. Here, the cleaning device can be located in a fixed position on the housing in order to achieve a still more compact and modular implementation of the cleaning device and thus of the camera module as well.

According to another embodiment, the cleaning device is designed to be coupled to the drive unit. In this way it is possible to transfer the cleaning device to an improved position to apply the fluid jet to the deflection element. In addition, the coupling to the drive unit offers the possibility of retracting the cleaning device back into the housing of the camera module after a cleaning process, by which means improved protection and a prolonged service life are achieved. It would be possible here to extend and retract the cleaning device in a telescoping manner with the aid of the drive unit, for example.

According to an especially preferred embodiment, the door is designed to be coupled to the drive unit. This makes it possible for the door to be automatically opened in conjunction with a cleaning process and closed again at the end of a cleaning process. This may take place by the means that the door is designed to be pivotable, for example. Alternatively, however, it can also be opened or closed by a linear motion or by a combination of a pivoting motion and a linear motion.

To reduce the manufacturing costs and to cut down on assembly of the door on the camera module, the door is designed such that it can be opened by the motion of the camera from the passive position to the active position. This additionally improves the reliability of the camera module. In this design, the door preferably is designed to be spring-mounted in order to ensure automatic closure after a cleaning process.

Exemplary embodiments of the invention are shown in the drawings and are described in detail below.

Figure 1:
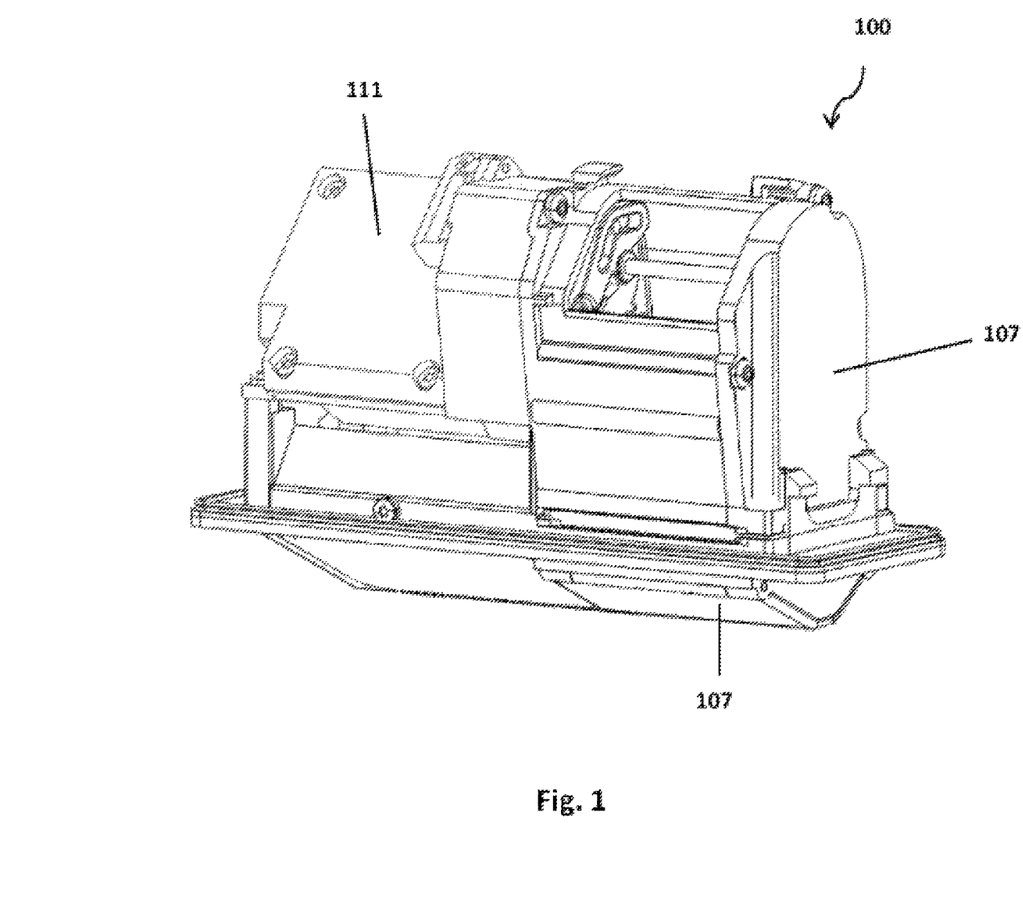
FIG. 1 a schematic representation of a camera module with housing.

FIG. 1 shows a schematic representation of a camera module 100 with a housing 107 and a drive unit 111 adjacent to the housing 107. Arranged in the interior of the housing 107 is a camera unit 101 (not shown) with a camera 103 and a lens 105, wherein the camera unit 101 is movable between a passive position in which the camera unit 101 is at least partially located in the housing 107 and an active position in which the camera unit 101 can acquire images of an outside area of a motor vehicle. The drive unit 111 is coupled to the camera unit 101, and can move the camera unit 101 back and forth between the passive position and the active position.

Additionally located in the housing 107 is a cleaning device 113 (not shown), which is either designed to be coupled to the drive unit 111 or, alternatively, is connected in a fixed manner to the housing 107 of the camera module 100.

DETAILED DESCRIPTION

Figure 2:
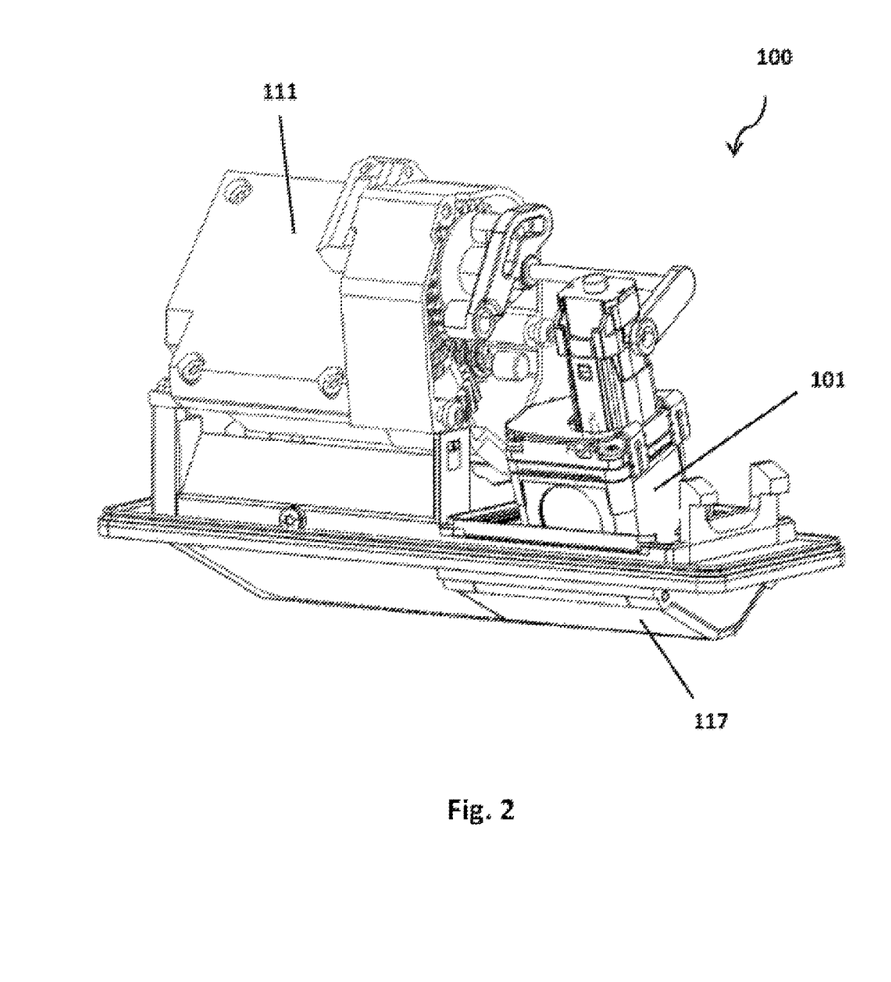
FIG. 2 a schematic representation of a camera module without housing.

FIG. 2 shows a schematic representation of a camera module 100 without the housing 107. Located in the interior of the housing 107 is the camera unit 101 with the camera 103 and the lens 105, with the camera unit 101 being in a passive position. The drive unit 111 is mechanically coupled to the camera unit 101, and can move the camera unit 101 back and forth between the passive position and the active position. Located on a bottom section of the camera module 100 is a door 117, in order to cover the camera unit 101 in the passive position. The door 117 is in a closed position.

Figure 3:
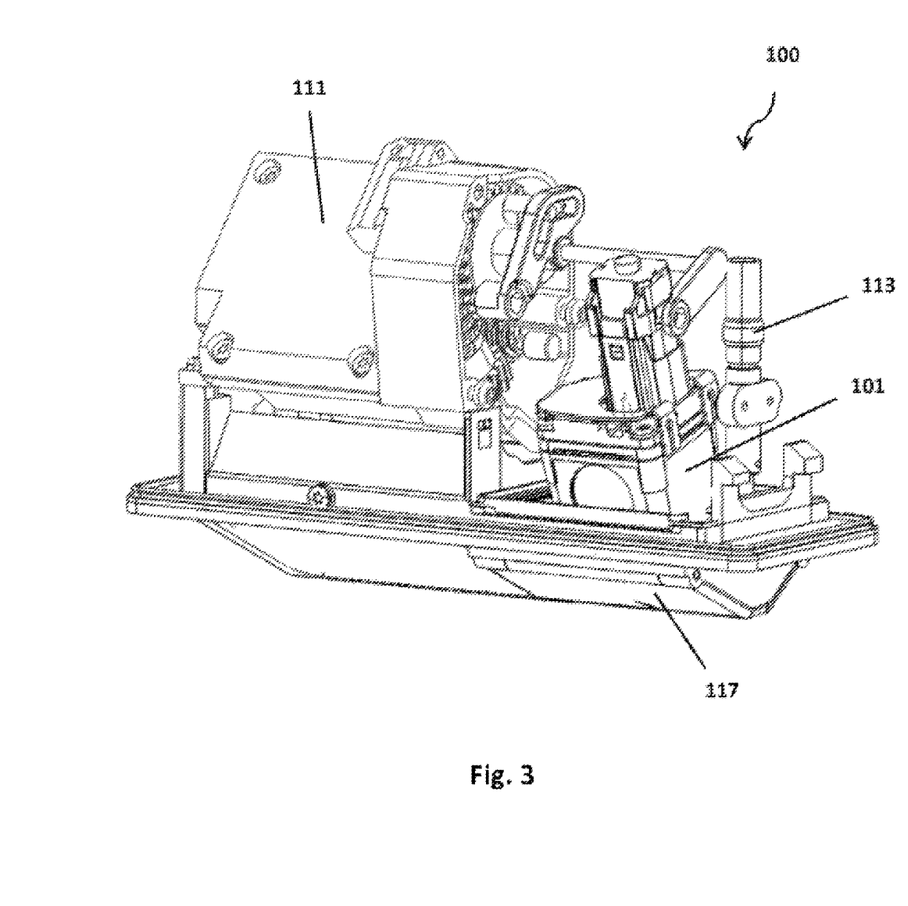
FIG. 3 another schematic representation of a camera module without housing.

FIG. 3 shows another schematic representation of a camera module 100 without the housing 107. In addition, located adjacent to the camera unit 101 is the cleaning device 113 for cleaning the lens 105 (not shown) of the camera unit 101 by means of a fluid jet. The cleaning device 113 can likewise be designed to be coupled to the drive unit 111 or be attached to the housing 107 in a fixed manner.

Figure 4:
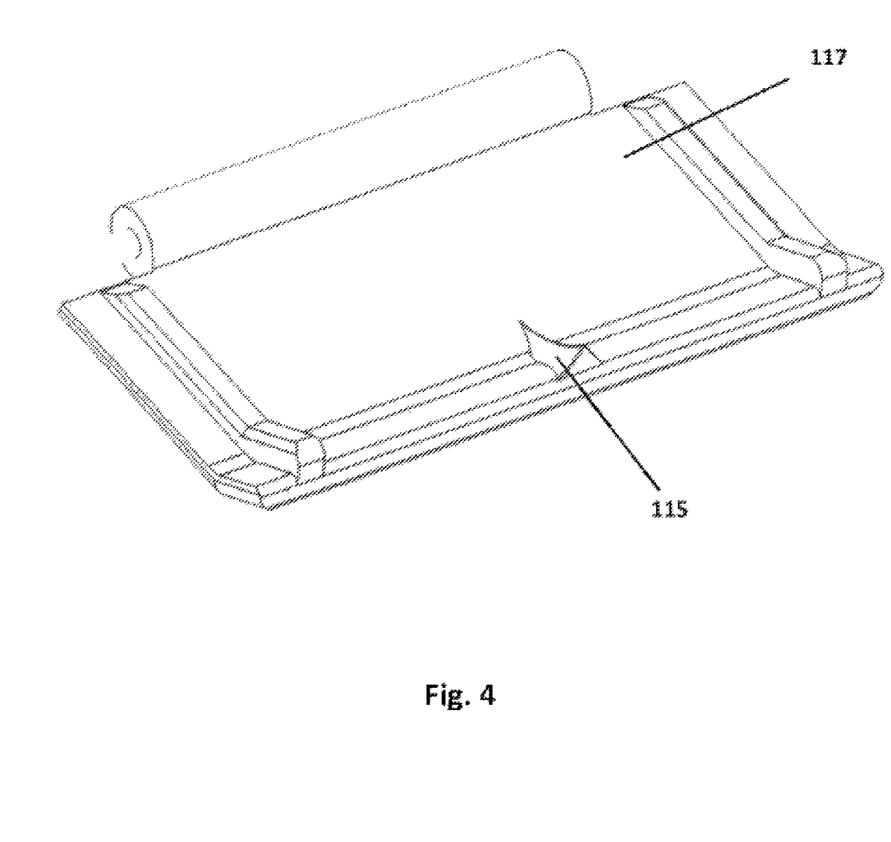
FIG. 4 a schematic representation of a door with deflection element.

FIG. 4 shows a schematic representation of a door 117 with a deflection element 115. The deflection element 115 is designed as one piece with the door 117; however, an implementation with replaceable deflection element 115 is equally possible. The deflection element 115 is designed to deflect the fluid jet discharged from the cleaning device 113 so as to impinge optimally on the lens 105. In this context, optimal means that the deflected fluid jet causes complete cleaning of an outer lens surface 106 without leaving contaminants in a stagnant area. The deflection element 115 is implemented in a concave manner in FIG. 4. Alternatively, however, it is likewise possible to implement the deflection element 115 in the form of a ramp.

Figure 5:
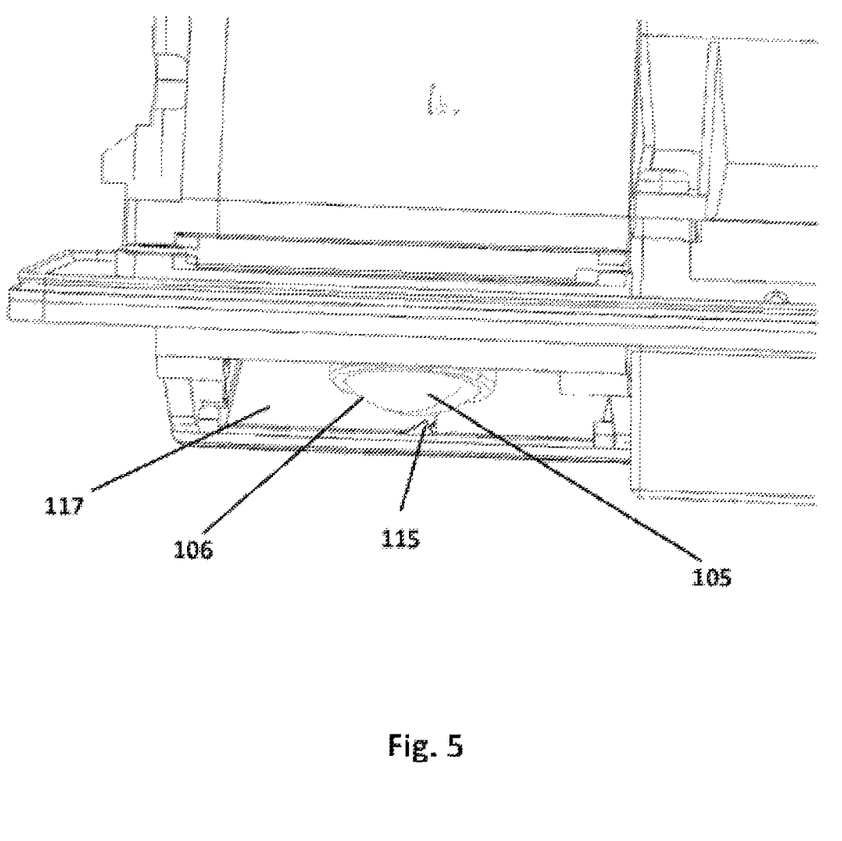
FIG. 5 a schematic representation of a camera module in the passive position, and FIG. 6 a schematic representation of a camera module in the active position.

FIG. 5 shows a schematic representation of a camera module 100 in the passive position. The camera unit 101 (not shown) is located at least partially inside the housing 107, and the door 117 covers the lens 105 of the camera unit 101. The lens 105 has an outer lens surface 106 facing the door 117, and the deflection element 115 is located in the center of the door 117 and adjacent to the lens 105 or the outer lens surface 106 of the camera unit 101.

Figure 6:
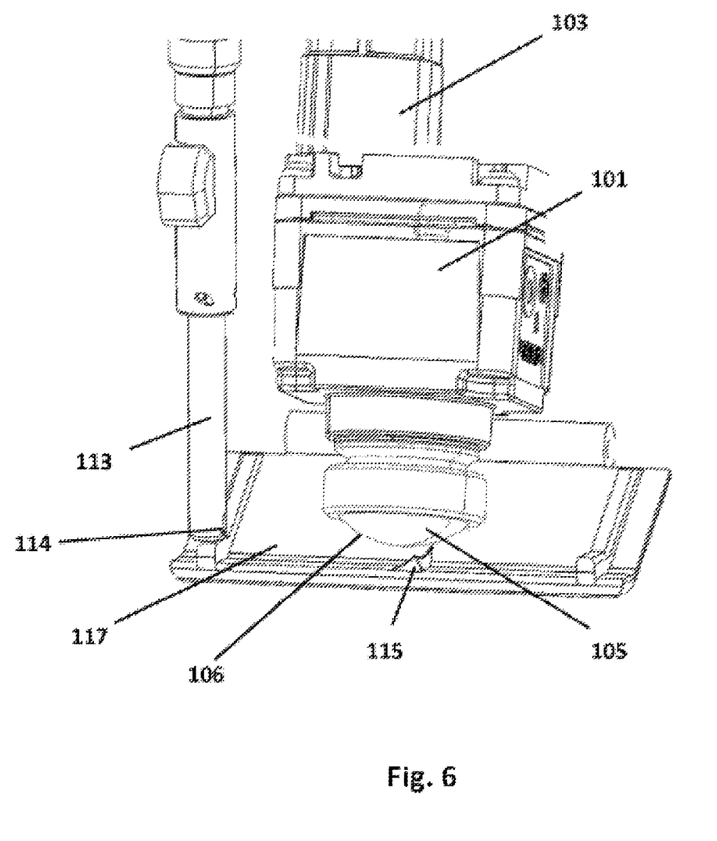

FIG. 6 shows a schematic representation of a camera module 100 in the active position. Arranged adjacent to or parallel to the camera unit 101 is the rod-shaped cleaning device 113 with a nozzle 114 located on the side of the cleaning device 113. As a result of the lateral discharge of a fluid jet from the nozzle 114, the fluid jet impinges directly on the concave deflection element 115. In consequence, the fluid jet is deflected by the deflection element 115 and is applied to the outer lens surface 106 of the lens 105. The door 117 is in an opened position here, wherein the door 117 is likewise designed to be coupled to the drive unit 111.

In this case, the door 117 can be designed to be movable by a pivoting motion, wherein upon reaching the opened state the door 117 is positioned precisely such that the deflection element 115 permits application of the deflected fluid jet onto the outer lens surface 106 as a function of the nozzle 114 of the cleaning device 113 or the fluid jet and the position of the outer lens surface 106. Alternatively, however, it is also possible to provide the door 117 with no coupling to the drive unit 111. In this case the door 117 is designed such that it can be opened by the motion of the camera 103 from the passive position to the active position. In this case, designing the door 117 with spring support is an obvious way to ensure complete closing of the door 117 after a cleaning process has been completed.

The invention is not restricted in execution to the above-mentioned, preferred exemplary embodiments. Instead, a number of variants are possible that make use of the solution presented even with embodiments of a fundamentally different nature. All features and/or advantages, including design details, spatial arrangements, and method steps, deriving from the claims, the description, or the drawings may be essential to the invention, both in and of themselves and in a wide variety of combinations.

The invention claimed is:

1. A camera module for a motor vehicle, the camera unit comprising:
   a camera unit including a camera and a lens, the camera unit being arranged in a housing and operable to be moved between a passive position in which the camera unit is at least partially located in the housing and an active position in which the camera unit is used for image acquisition of an outside area of the motor vehicle;
   a drive unit coupled to the camera unit and operable to move the camera unit between the passive position and the active position;
   a cleaning device for cleaning the lens of the camera unit with a fluid jet; and
   a deflection element operable to deflect the fluid jet onto the lens.

2. The camera module according to claim 1, wherein the deflection element is operable to deflect the fluid jet for cleaning an entire outer lens surface of the lens.

3. The camera module according to claim 1, wherein the camera module includes a door operable to cover the camera unit in the passive position.

4. The camera module according to claim 3, wherein the deflection element is located on the door.

5. The camera module according to claim 3, wherein the deflection element is formed as a single piece with the door.

6. The camera module according to claim 3, wherein the deflection element is clipped onto the door.

7. The camera module according to claim 3, wherein the deflection element is located at the center of the door adjacent to the lens of the camera unit.

8. The camera module according to claim 1, wherein the deflection element includes the shape of a ramp.

9. The camera module according to claim 1, wherein the deflection element is concave.

10. The camera module according to claim 1, wherein the deflection element is pivotable.

11. The camera module according to claim 1, wherein the cleaning device is rod-shaped.

12. The camera module according to claim 1, wherein the cleaning device is coupled to the drive unit.

13. The camera module according to claim 1, wherein the cleaning device is located in a fixed position on the housing.

14. The camera module according to claim 1, wherein the camera module includes a door operable to cover the camera unit in the passive position, the door being pivotable relative to the housing.

15. The camera module according to claim 14, wherein the door is coupled to the drive unit.

16. The camera module according to claim 14, wherein the door is operable to be opened by the motion of the camera from the passive position to the active position.

17. The camera module according to claim 16, wherein the door is spring-mounted.

* * * * *